March 10, 1970  H. E. BENNETT  3,499,716
WIDE RANGE ABSOLUTE REFLECTOMETER
Original Filed Dec. 27, 1960  2 Sheets-Sheet 1

INVENTOR.
HAROLD E. BENNETT
BY P. H. Fisht
ATTORNEY.

INVENTOR.
HAROLD E. BENNETT

ATTORNEY.

United States Patent Office 3,499,716
Patented Mar. 10, 1970

3,499,716
WIDE RANGE ABSOLUTE REFLECTOMETER
Harold E. Bennett, China Lake, Calif., assignor to the United States of America as represented by the Secretary of the Navy
Continuation of application Ser. No. 78,791, Dec. 27, 1960. This application May 27, 1966, Ser. No. 560,037
Int. Cl. G01n 21/48, 21/16
U.S. Cl. 356—209   3 Claims

ABSTRACT OF THE DISCLOSURE

An instrument for measuring reflectance in the infrared as well as the visible spectrum comprising a system of plane and spherical mirrors, which twice images the exit pupil rather than the exit slit of a monochromator on the sample surface, including a pair of identical, or substantially identical, spherical mirrors posiitoned symmetrically with respect to the sample surface, each mirror of the pair having a radius of curvature whose center of curvature is at the sample surface, with provision for, in effect, optically interchanging the positions of the pair of mirrors.

CROSS-REFERENCES TO RELATED APPLICATIONS

This is a continuation of application Ser. No. 78,791, filed Dec. 27, 1960.

The invention herein described may be manufactured and used by or for the Government of the United States of America for governmental purposes without the payment of any royalties thereon or therefor.

In measuring specular reflectance, there are considerable advantages to be gained by making the measurements at nearly normal incidence. However, these advantages have been largely unrealized because of the difficulties involved in making such measurements both absolute and of high accuracy. The degree of these difficulties will be appreciated when it is considered that, with few exceptions, the best reflectance values reported for normal incidence have been obtained by calculation, rather than by direct measurement. Also, there may be various systematic errors in the measured reflectance such as displacement of the sample from normal position which causes light reflected by the sample to be imaged on a detector in a way that is difficult from that of a reference beam; measuring relative to a reference mirror the reflectance of which may not be known exactly; light of wavelengths other than that being measured may be incident on the sample because of scattering in the monochromator; light scattered in the reflectometer may impinge upon the detector; and the optical path lengths of the sample and reference beams may differ whereby additional absorption may occur in one of the paths. In addition, serious errors can result from the use of improper samples; in particular, sizable systematic errors may occur unless the surface of the sample is sufficiently smooth. Appreciable systematic error will be present in specular reflectance even if the root mean square value of the surface irregularities is of the order of only one-one hundredth of the wavelength.

Several systems for measuring reflectance have been used which minimize one or more of the sources of systematic errors hereinbefore referred to. One such system, as well as the reflectometer of the present invention, is reported by H. E. Bennett and W. F. Koehler in the "Journal of the Optical Society of America," volume 50, No. 1, page 1; January 1960, and employs a reflectometer of the type described in "Procedures in Experimental Physics" by John Strong (Prentice-Hall, Incorporated, Englewood Cliffs, N.J., 1938) at page 376, with an integrating sphere ahead of the detector to compensate for any possible image shift. The square of the absolute reflectance of the sample can be obtained from the ratio of two readings corresponding to the two conditions of sample-in and sample-out. In the sample-in position light is reflected from the sample to one of two identical plane mirrors and then back to the sample for a second reflection. In the sample-out position, light is only reflected from the other plane mirror. If the reflectances of the two plane mirrors are identical, the ratio of the intensities recorded in the two configurations gives the square of the absolute reflectance of the sample directly. If they are not identical, the plane mirrors may be interchanged and a second measurement made. If the product of the reflectance values obtained in the two measurements is taken, the contribution from the two nonidentical plane mirrors cancels. Because the square of the sample reflectance is measured, the value of the absolute reflectance is obtained with a higher precision than would be possible if there were only one reflection from the sample. This system yields values of high precision but cannot be used to obtain precise absolute reflectance values in the infrared region of the spectrum because use cannot be made of the integrating sphere. Without an integrating sphere such an apparatus yields results which are very sensitive to the positioning of the sample. This is because the reflected beam is deflected through twice the angle through which the reflecting surface is tilted for each reflection. Since a long optical path is used, a small tilt of the sample due to a particle of dust can displace the beam and shift the image on the detector, introducing a systematic error in the measurements. To measure infrared reflectance absolutely, use has been made of reflectometers of the types reported by J. T. Gier, R. V. Dunkle and J. T. Bevans in the "Journal of the Optical Society of America, volume 44, No. 7, page 558; January 1954, and by D. M. Gates, C. C. Shaw and Donald Beaumont in the "Journal of the Optical Society of America," volume 48, No. 2, page 88; February 1958. In the former, the sample is mounted in a heated hohlraum and radiation reflected from the sample surface is focused on one entrance slit of a double beam spectrometer; part of the hohlraum wall, which acts like a black body radiator, is focused on the other entrance slit of the spectrometer. This type reflectometer has the disadvantage of the possibility of sample emission which is a major source of error. In the latter type of infrared reflectometer, a pair of identical sample plates are arranged in exact parallel relation with different spacings ot obtain multiple reflection readings. Theoretically, if the sample plates were exactly parallel, the accuracy of the results would be high; however, the problem of aligning the plate in exact parallelism is formidable and extremely difficult to achieve.

It is therefore an object of the present invention to provide a reflectance measuring system which operates over a wide wavelength range including the infrared and visible spectrum.

Another object is to provide a reflectometer for the measurement of reflectance absolutely with high precision in the infrared wavelength range.

A further object is to provide a reflectometer possessing unique features for minimizing or eliminating sources of systemic errors commonly encountered in devices of this type.

Other objects, features and attendant advantages of the present invention will be readily appreciated as the same become better understood by reference to the following detailed description and accompanying drawings wherein.

Figure 1:
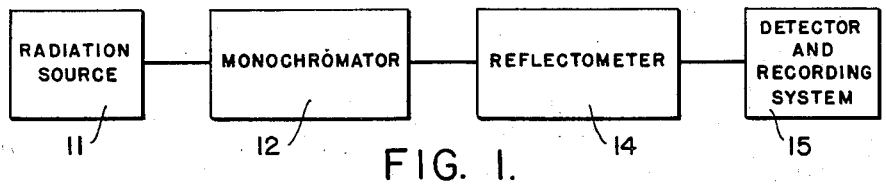
FIG. 1 is a block diagram of a reflectance measuring system incorporating the reflectometer of the present invention.

Referring now to the drawings, which illustrate one embodiment of the invention and wherein like numerals refer to like parts throughout the several views, in FIG. 1 is shown a block diagram of a reflectance measuring system comprising a radiation source 11, a monochromator 12, a reflectometer 14 and a detector and recording system 15.

The monochromator 12 is of the type which uses a double-pass system with a chopper between the first and second pass and was chosen because the chopped, scattered, short wavelength radiation which passes through the exit slit is reduced to a negligible amount. The effect of the small amount of long wavelength radiation which is emitted by the internal optics of the monochromator can be conveniently eliminated by placing a shutter over the entrance slit and including this signal in the zero reading. A constant temperature water bath was provided to prevent an observable change in the wavelength calibration as the instrument heats up during use. Additionally, a fraction of the light passing through the exit slit was imaged on an auxiliary thermocouple the output of which regulates the slit width through a slit servo system. This modification, which has also been made by others, provides in a single beam system the advantages of double beam operation without its attendant difficulties.

Figure 2:
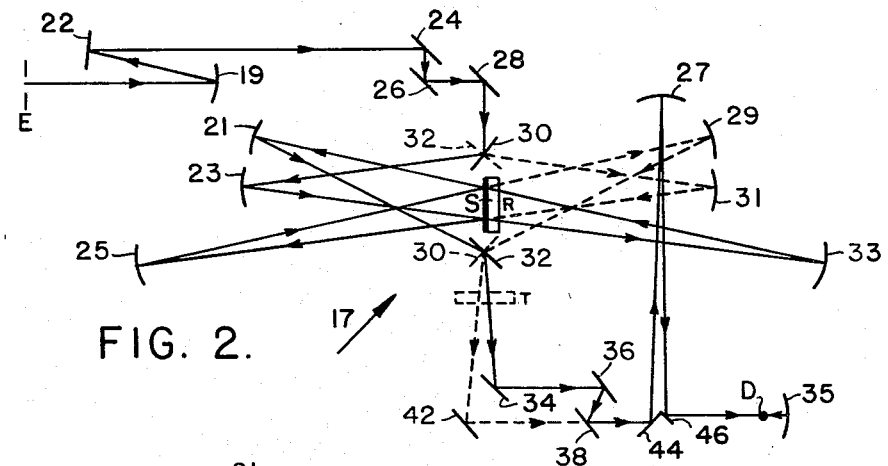
FIG. 2 is a schematic diagram illustrating mainly the optical system of the reflectometer.

The reflectometer 14, which is the subject of the present invention, includes an optical system designated generally by numeral 17 and schematically illustrated in FIG. 2. The optical system comprises spherical mirrors 19, 21, 23, 25, 27, 29, 31, 33 and 35, and plane mirrors 22, 24, 26, 28, 30, 32, 34, 36, 38, 42, 44 and 46. A sample S, whose reflectance is to be measured, is positioned between plane mirrors 30 and 32 at a position R which is one sample-in positon. Provision is made, by means later described, for rotating the sample 180 degrees about an axis of rotation which lies in the plane of the surface of the sample for the purpose of facing the sample in the opposite direction and switching the positions of the plane mirrors 30 and 32. This places the sample in a second sample-in position, reverses mirrors 30 and 32 and, in effect, optically interchanges spherical mirrors 25 and 33.

With the sample positioned as shown in FIG. 2, light from exit slit E of the monochromator 12 follows the light path indicated by the solid lines to spherical mirror 23 which reflects to one portion of the sample S. The surface of the sample reflects to spherical mirror 25 which reflects to another portion of the sample, the surface of which reflects to spherical mirror 21. Mirror 21 reflects to plane mirror 32 after which the light follows the light path indicated by the solid lines by way of mirrors 34, 36, 38, 44, 27, 46 and 35 to a detector comprising a thermocouple D which is operatively connected to the recording system.

Provision is also made by the later described means for withdrawing the sample from the light path in order that the light from mirror 23 is then reflected to mirror 33 which reflects to mirror 21 and the light path is then as before.

With the sample S and mirrors 30 and 32 rotated 180 degrees, the sample is in the second sample-in position, mirrors 30 and 32 are reversed and mirrors 25 and 33 are optically interchanged. In such position of the sample, the light from mirror 28 is reflected by switched mirror 32 (which has replaced mirror 30 and is shown in dotted lines) to mirror 31. Mirror 31 reflects to a portion of the sample S, the surface of which reflects to mirror 33, which reflects to another portion of the sample which reflects to mirror 29. Mirror 29 reflects to mirror 30 (which has replaced mirror 32 and is shown in dotted lines) which reflects to mirror 42. Mirror 42 reflects to mirror 44 after which the light path is as before. Provision is made for withdrawing mirror 38 from the path of the light from mirror 42 to mirror 44.

Spherical mirror 19 reflects light from exit slit E of monochromator 12 and performs several functions; it images the exit slit between mirrors 30 and 23, it reduces the convergence angle of the cone of light from the exit slit, and it images the exit pupil on mirror 22.

An important feature of the optical system 17 is the arrangement of the spherical mirrors 25 and 33 relative to the surface of the sample S when it is in the sample-in positions. Mirrors 25 and 33 are chosen to be identical, or nearly identical as is possible, and are positioned symmetrically with respect to the surface of the sample S when it is in the sample-in position, with each of the mirrors 25 and 33 having a radius of curvature whose center of curvature is at the sample surface. If mirrors 25 and 33 are identical, the ratio of the measurements when the sample is in the light path and out of it gives the square of the sample reflectance directly. If mirrors are not identical, they may be interchanged and measurements taken to obtain a second ratio. If the product of the two ratios is taken, it will give the fourth power of the absolute reflectance and the contribution from the non-identical mirrors cancels.

Figure 3:
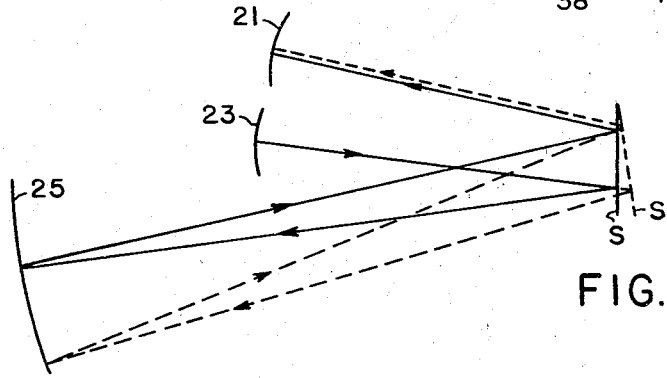
FIG. 3 is a showing, on a larger scale, of a portion of the system of FIG. 2 and illustrates a feature which compensates for displacement of the sample from the normal position.

FIG. 3 illustrates a unique compensating feature of the optical system 17. The solid lines represent the path of a light ray when the sample S is in its normal position. If a small displacement or tilt occurs, such as might be caused by a particle of dust, the sample may occupy position S'; the light ray then follows the dotted lines. Since the light ray is almost normally incident on the sample and since the spherical mirror 25 has a focal range larger than the maximum sample displacement, only a small change in angle of the light rays reflected by the sample to mirror 25 will result. Since mirror 25 is spherical, it reimages the light at the same point as before regardless of this small change in angle. This small change in angle is exactly cancelled at the second reflection from the tilted sample so that the solid and dotted lines to mirror 21 actually coincide. The direction, lateral position, size and shape of the beam to mirror 21 are then unaffected by a slight displacement or tilt of the sample. Consequently, there is no shift or change in size of the image on the thermocouple D. This applies also to spherical mirror 33.

Figure 4:
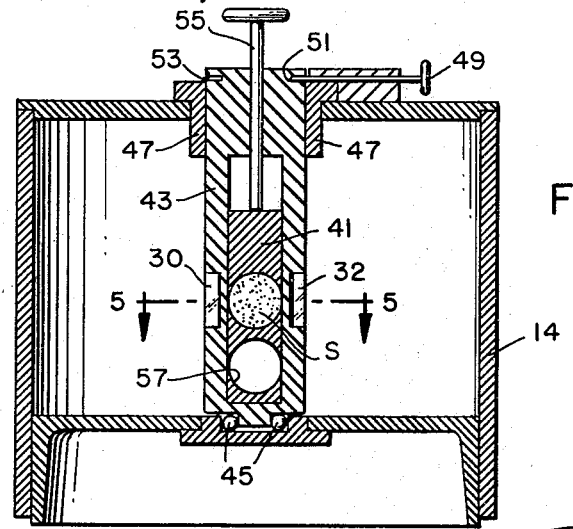
FIG. 4 is a vertical section of sample holder of the reflectometer.

Turning now to FIG. 4, the sample S is mounted in a member 41 adapted to slide in a housing 43 disposed within the reflectometer 14 and supported for rotation on ball bearings 45. Surrounding the upper end of rotatable housing 43 is a collar 47 which carries a positioning pin 49 adapted to be received in either of two diametrically opposite holes 51, 53 in the upper end of the housing. The slidable member 41 is provided with a control member 55 and has a transverse bore 57 through its lower portion. In the lowermost position of member 41, the sample S is in the sample-in position; in the upper most position of member 41, the sample is in the sample-out position.

Figure 5:
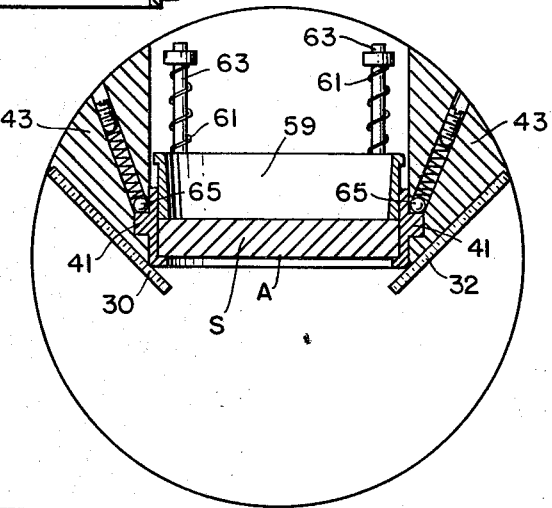
FIG. 5 is a larger scale horizontal section, taken along lines 5—5 of FIG. 4.

For a better understanding of the manner of supporting the sample S, reference may be had to FIG. 5 in which it is seen that the sample is supported on the slidable member 41 by means of a retaining ring 59 resiliently urged against the back of the sample by springs 61 on screws 63. The slide member 41 is positioned by means of control member 55 and is held in such position by spring-pressed balls 65. The several parts are proportioned and arranged so that they do not vignette light passing through the sample or bore 57 and the axis of rotation of the housing 43 lies in the plane of the surface of the sample S and passes through point A.

In the operation of the reflectometer, light from exit slit E of the monochromator is reflected from mirror 19 which images the exit pupil of the monochromator on plane mirror 22. When the sample S is in the first sample-in position, the exit pupil is then reimaged on the sample surface by mirror 23, the sample surface reflecting the light to mirror 25. The exit pupil is then reimaged by mirror 25 at the sample surface where the light is reflected to mirror 21. When the sample is in the sample-out position, light from mirror 23 passes through bore 57 to mirror 33 which reimages the exit pupil in the plane of the position formerly occupied by the sample surface and reflects the light to mirror 21. In either case, light impinges upon mirror 21 and is reflected by mirrors 32, 34, 36, 38, 44, 27, 46 and 35 to impinge upon the thermocouple D, mirrors 21, 27 and 35 serving to demagnify the image of the exit slit of the monochromator so that it does not overfill the thermocouple. By twice imaging the exit pupil, rather than the exit slit, on the sample surface, the two areas on the sample which are illuminated are independent of exit slit width setting. It is understood that when the sample S is positioned to face in the opposite direction, as by rotating housing 43 180 degrees, the counterparts of mirrors 21, 23 and 25, namely; mirrors 29, 31 and 33, respectively, come into play to perform their functions.

The transmittance of a sample may be measured by providing for the sample to be positioned in and out of the light path between mirrors 32 and 34, as at position T in FIG. 2, and taking measurements with the sample in and out of the light path.

Figure 6:
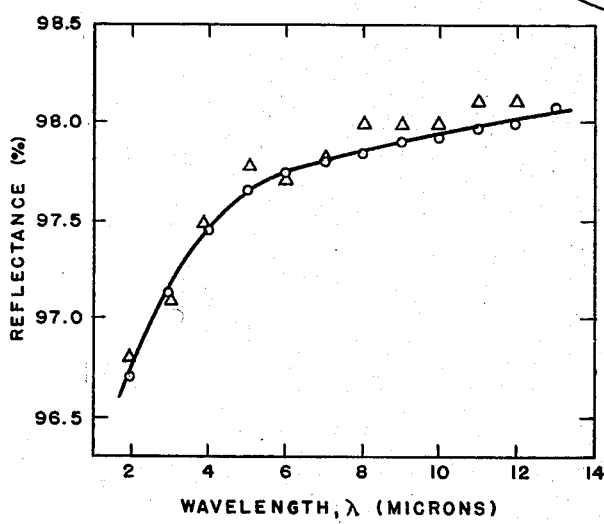
FIG. 6 is a comparison of the reflectance measurements of aluminum obtained using the reflectometer of the present invention with the infrared reflectance measurements obtained using a polarimetric system.

FIG. 6 compares reflectance values for aluminum obtained using the reflectometer of the instant invention, represented by circles, with the values for aluminum reported by J. R. Beattie in the "Philosophical Magazine," volume 46, page 235; 1955, with a claimed accuracy of ±0.25%, represented by triangles. The average deviation from a smooth curve of the values obtained by the reflectometer of this invention is ±0.02% and the maximum difference between these values and the reported values is 0.1%.

Figure 7:
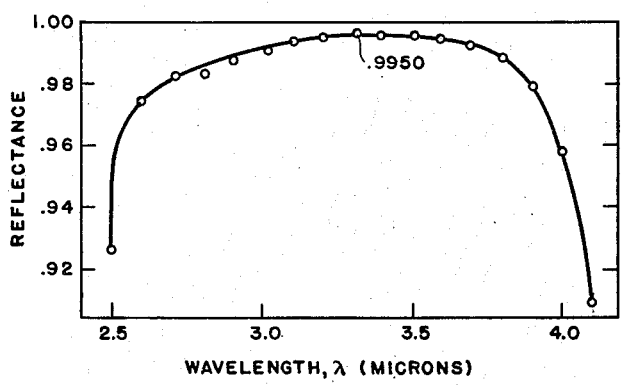
FIG. 7 is a reflectance versus wavelength curve showing the results of measurements made with the reflectometer of a highly reflective multilayer film on a fuzed quartz substrate.

In general, it is difficult to measure with precision reflectance very close to unity. FIG. 7 shows the results of some reflectance measurements of this type made with the reflectometer of this invention. The sample was a multilayer dielectric film on a fuzed quartz substrate prepared for use in a maser experiment. This film had a maximum reflectance of 0.9950. At the same wavelength the transmittance, which was also measured with this reflectometer, was 0.0015 of the incident energy. The light scattered or absorbed by the film was therefore only slightly more than three tenths of one percent.

As hereinbefore mentioned, the maximum surface roughness of a sample permissible for accurate specular reflectance measurement is very small. This is because for larger surface roughnesses the specular reflectance becomes a function of both the intrinsic material and its surface roughness. Even if all of the diffusely reflected light from a rough surface could be collected, the measured reflectance would differ from that which a perfectly smooth surface would have at normal incidence since the light is striking the surface irregularities at various angles of incidence and the reflectance is a function of the angle of incidence. Thus, in general, the reflectance of a surface is a function of its roughness. If light of a suffiiently long wavelength is used, the decrease in the measured specular reflectance due to surface roughness is a function only of the root mean square height of the surface irregularities. Long wavelength specular reflectance measurements thus provide a simple and sensitive method for accurate measurement of surface finish. This method is particularly useful for surface finishes too fine to be measured accurately by conventional profile tracing instruments. From measurement of the reflectance, a value of the root mean square surface roughness can be obtained which is in good agreement with results obtained using other techniques.

The reflectance at essentially normal incidence has been measured as a function of wavelength in the 2–22 micron infrared region using the reflectometer of the present invention. With suitable prisms, it would be possible to cover the wavelength range from about 0.4 to about 40 microns with sufficient resolution for surface roughness measurement.

Absolute reflectance values with an accuracy of ±0.001 have been obtained using the reflectometer of this invention. Measurements can be made on opaque as well as transparent materials over a wide wavelength range with high accuracy.

Though focusing of mirrors 25 and 33 is critical, since measurements are made in the two configurations obtained by optically interchanging these mirrors, an error in focus merely gives one mirror an apparently lower reflectance than the other and does not introduce a systematic error. The resultant reflectance of a sample remains unchanged even when the measured reflectance in the two configurations differs by as much as 1%.

This invention thus provides a reflectometer which operates over a wide wavelength range including the infrared as well as the visible spectrum, measures absolute reflectance with high precision without the requirement for an integrating sphere and minimizes or eliminates sources of systematic errors.

What is claimed is:
1. A reflectometer which comprises:
sample mounting means for mounting a plane sample having a reflecting surface;
means for rotating the sample mounted in the sample mounting means 180 degrees about an axis in the plane of the reflecting surface of the sample for facing the sample for reflection in the opposite direction from that before rotation;
means for providing a radiation beam;
radiation means for removing the plane sample from the radiation beam and replacing it therein without loss of registry;
a first spherical mirror (25) mounted for receiving radiation from a first area of the reflecting surface of the sample and for reflecting the received radiation back onto a second area of the reflecting surface of the sample, the center of curvature of said first spherical mirror being located in the plane of the reflecting surface of the sample;
a second spherical mirror (33) substantially identical with said first spherical mirror and mounted symmetrically with respect to the first spherical mirror relative to the plane of the reflecting surface of a sample mounted in the sample mounting means and mounted so that the centers of curvature of said first and second spherical mirrors coincide in the plane of the reflecting surface of the sample; and
means for imaging the radiation after its second reflection from the reflecting surface of the sample onto a radiation detector, said means for imaging the radiation being adapted for producing substantially the same images on the detector when a sample is in an original position in the sample mounting means, is in a position rotated 180 degrees from the original position and is removed from the radiation beam;
said means for imaging the radiation after its second reflection further including: another spherical mirror (31) mounted relative to the plane of the reflecting surface of a sample mounted in the sample mounting means and rotated 180 degrees from the original position for receiving the radiation beam and imaging it on the sample in rotated position and another spherical mirror (29) mounted relative to the plane of the reflecting surface of a sample mounted in the sample mounting means and rotated 180 degrees from the original position for receiving and reflecting radiation from the sample onto the radiation detector.

2. A reflectometer which comprises:
sample mounting means for mounting a plane sample having a reflecting surface;
means for providing a radiation beam;
radiation means for moving a plane sample from the radiation beam and replacing it therein without loss of registry;
means for rotating a sample mounted in the sample mounting means 180 degrees about an axis in the plane of a reflecting surface of the sample for facing the sample for reflection in the opposite direction from that before rotation;
a first spherical mirror (19) mounted for receiving and reflecting radiation from an exit slit;
a second spherical mirror (23) mounted for receiving radiation from the first spherical mirror and imaging it on a first area of the reflecting surface of a sample in the sample mounting means;
a third spherical mirror (25) mounted for receiving the radiation reflected from the surface of a sample in the sample mounting means and reimaging it at unit magnification on a second area of said reflecting surface;
a fourth spherical mirror (21) mounted for receiving the radiation reflected from the surface of a sample in the sample mounting means and reflecting it;
means for imaging the radiation after its reflection from the fourth spherical mirror (21) onto a radiation detector, said means for imaging the radiation being adapted for producing substantially the same images on the detector when a sample is in an original position in the sample mounting means, is in a position rotated 180 degrees from the original position and is removed from the radiation beam;
said means for imaging further including a fifth spherical mirror (31) substantially identical with said second spherical mirror (23) and mounted symmetrically with respect thereto relative to the plane of the reflecting surface of a sample mounted in the sample mounting means and rotated 180 degrees from the original position;
a sixth spherical mirror (33) substantially identical with said third spherical mirror (25) and mounted symmetrically with respect thereto relative to the plane of the reflecting surface of a sample mounted in the sample mounting means and rotated 180 degrees from the original position, and
a seventh spherical mirror (29) substantially identical with said fourth spherical mirror (21) and mounted symmetrically with respect thereto relative to the plane of the reflecting surface of a sample mounted in the sample mounting means and rotated 180 degrees from the original position; and
a pair of plane mirrors (30 and 32) mounted on the sample mounting means to direct radiation to the second spherical mirror (23) and the fourth spherical mirror (21) with the plane sample in its original position and to the fifth spherical mirror (31) and the seventh spherical mirror (29) with the plane sample in a position rotated 180 degrees from the original position.

3. A reflectometer which comprises:
sample mounting means for mounting a plane sample having a reflecting surface;
radiation means for providing a radiation beam;
slide means for removing the plane sample from its original position in the radiation beam and replacing it therein without loss of registry;
means for rotating the sample mounted in the sample mounting means 180 degrees about an axis in the plane of a reflecting surface of the sample for facing the sample for reflection in the opposite direction from that before rotation;
a first spherical mirror (19) mounted for receiving and reflecting radiation from an exit pupil and an exit slit and for imaging the exit pupil and the exit slit, at predetermined points;
a second spherical mirror (23) mounted for receiving radiation from the first spherical mirror and imaging the exit pupil on a first area of the reflecting surface of a sample in the sample mounting means and imaging the exit slit at a predetermined point;
a third spherical mirror (25) mounted for receiving the radiation reflected from the reflecting surface of a sample in the sample mounting means and reimaging the exit pupil on a second area of said reflecting surface;
a fourth spherical mirror (21) mounted for receiving the radiation reflected from the surface of a sample in the sample mounting means and reflecting said radiation to predetermined points;
means for imaging the exit slit onto a radiation detector, said means being adapted for producing substantially the same images on the detector when a sample is in an original position in the sample mounting means, is in a position rotated 180 degrees from the original position and is removed from the radiation beam;
said means for imaging further including a fifth spherical mirror (31) substantially identical with said second spherical mirror (23) and mounted symmetrically with respect thereto relative to the plane of the reflecting surface of a sample mounted in the sample mounting means and rotated 180 degrees from the original position, and
a sixth spherical mirror (33) substantially identical with said third spherical mirror (25) and mounted symmetrically with respect thereto relative to the plane of the reflecting surface of a sample mounted in the sample mounting means and rotated 180 degrees from the original position, and
a seventh spherical mirror (29) substantially identical with said fourth spherical mirror (21) and mounted symmetrically with respect thereto relative to the plane of the reflecting surface of a sample mounted in the sample mounting means and rotated 180 degrees from the original position; and
a pair of plane mirrors (30 and 32) mounted on the sample mounting means to direct radiation to the second spherical mirror (23) and the fourth spherical mirror (21) with the plane sample in its original position and to the fifth spherical mirror (31) and the seventh spherical mirror (29) with the plane sample in a position rotated 180 degrees from the original position.

References Cited

UNITED STATES PATENTS

| | | | |
|---|---|---|---|
| 2,561,243 | 7/1951 | Sweet | 356—222 X |
| 3,402,634 | 9/1968 | Bennett | 356—36 |

JEWELL H. PEDERSEN, Primary Examiner

WARREN A. SKLAR, Assistant Examiner

U.S. Cl. X.R.

356—244